United States Patent [19]

Thompson

[11] 4,395,942
[45] Aug. 2, 1983

[54] ALOE VERA PLANT GEL SEPARATOR

[76] Inventor: Donnie Thompson, Combes Rio Hondo Rd., Rte. #2, Harlingen, Tex. 78550

[21] Appl. No.: 311,423

[22] Filed: Oct. 14, 1981

[51] Int. Cl.³ .............................................. B30B 9/20
[52] U.S. Cl. ..................................... 100/37; 100/39; 100/97; 99/538; 83/874; 144/246 F
[58] Field of Search ...................... 100/95, 96, 97, 37, 100/39, 118, 121; 99/509, 537, 538, 540, 567, 568, 584; 83/418–420, 870–874; 144/246 F, 193 R

[56] References Cited

U.S. PATENT DOCUMENTS

| | | | |
|---|---|---|---|
| 1,504,130 | 8/1924 | MacBeth et al. | 83/418 |
| 2,241,081 | 5/1941 | Clark | 99/509 |
| 2,515,748 | 7/1950 | Wallace et al. | 100/97 |
| 4,183,294 | 1/1980 | Williams et al. | 99/537 |

Primary Examiner—Peter Feldman
Attorney, Agent, or Firm—Frank P. Cyr

[57] ABSTRACT

An apparatus for feeding an aloe vera plant leaf to a cutting knife. The apparatus is designed to transport the leaf on a first endless belt conveyor on which the leaf is laid lengthwise and flat on the conveyor belt. A second endless belt conveyor travels in the same direction and at the same speed as the first endless belt conveyor but is disposed at a right angle to the first endless belt conveyor at the feed end of the apparatus. The first endless belt conveyor in its travel is slowly twisted towards the second endless belt conveyor and by the time the first endless belt conveyor has reached the end of its travel, the leaf has been turned from a flat condition to a now vertical position and is sandwiched between the two sets of endless conveyor belts. With the leaf now standing on its edge between the aforesaid sets of endless belt conveyors, the same is fed into the apparatus where the leaf will be cut into two half sections and thereafter the gel within the leaf will be squeezed from therewithin and the gel recovered.

6 Claims, 9 Drawing Figures

ALOE VERA PLANT GEL SEPARATOR

BACKGROUND OF THE INVENTION

The aloe vera plant comprises a fleshy, succulent leaf which is lance-shaped and grows in a warm climate. The leaf has jagged edges set with thorny spines along the outer edges thereof and contains a gel which, when extracted therefrom, is used in the preparation of medicinal compositions, cosmetics, soaps, medicants, etc. Extracting the gel from the leaf poses some problems since the leaf must first be split lengthwise in order to make the gel accessible for recovery.

In the past, the gel has been recovered by one first splitting the leaf lengthwise along the thickness of the leaf to thus present two half sections and then employing a hand tool such as a scraper to scrape the inner portion of the leaf to thus effect a recovery of the gel. As can be appreciated, this manner of recovering the gel was quite time-consuming and necessitated the employment of manual labor to recover the gel.

With the above in mind, it is one object of the invention to provide an apparatus which will automatically present an aloe vera leaf while the leaf is standing on its edge and to force the same against a cutting edge which will cut the leaf lengthwise along the thickness of the leaf into two sections and following the cutting operation, the leaf sections are then fed to squeezing rollers where the gel from within the leaf sections will be expressed from therewithin.

Another object of the invention is to provide a means whereby regardless of the thickness of the leaf, the same will always be centered with respect to the edge of the cutter mechanism to thereby cut the leaf lengthwise and centrally of the leaf.

Another object of the invention is to provide a means whereby the endless belts employed for transporting the leaf to the cutter mechanism of the apparatus will always exert a constant pressure on the leaf sandwiched between the pairs of endless belts feeding the leaf into the apparatus.

Another object of the invention is to provide a single source of power to drive all of the working rollers of the apparatus.

Other objects and advantages of the present invention will be made more apparent as this description proceeds, particularly when considered in connection with the accompanying drawings.

DESCRIPTION OF THE PREFERRED EMBODIMENT

Before undertaking a detailed description of the gel separator of the present invention, it should be pointed out that the thickness of an aloe vera leaf can vary anywhere from $\frac{1}{4}''$ to $1\frac{1}{2}''$ and in order to efficiently remove the gel from within the leaf it is important that the leaf be cut lengthwise along the thickness thereof into two equal half sections and the structure to be described in detail hereinafter provides for the automatic cutting of the leaf into two half sections and to thereafter expressing the gel from the half sections by passing them through pairs of squeeze rollers and collecting the gel thus expressed from the leaf.

Figure 5:
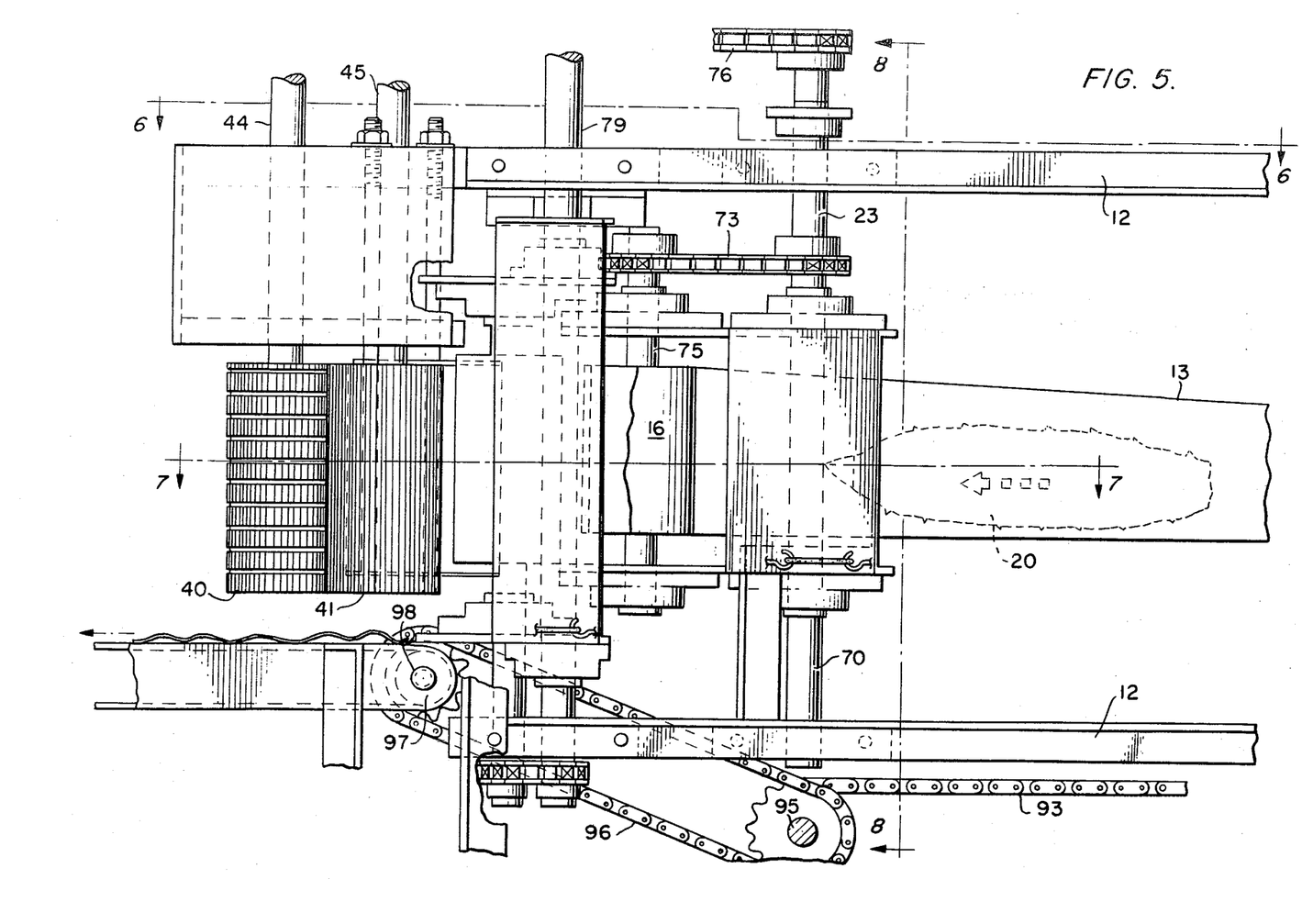
FIG. 5 is a section taken on lines 5—5 of FIG. 4, looking in the direction of the arrows.

Referring now to the drawings wherein like reference numerals are employed to designate like parts throughout the several views, reference numeral 10 designates in general the gel separator of the present invention. A framework for supporting the components of the gel separator comprises vertical uprights 11 which are joined in any known manner to horizontally extending angle irons or the like 12. Mounted for horizontal travel on the said framework is a pair of endless belt conveyors 13 and 14. Conveyors 13 and 14 are designed to travel in the same direction and at the same rate of speed. One end of conveyor 13 is trained for travel over a horizontally extending roller 15 whereas the opposite end of the conveyor is trained for travel over a vertically extending roller 16, shown more particularly in FIGS. 5 and 7 of the drawings. The conveyor 14 is trained for travel over a vertically extending roller 17 while the opposite end of the conveyor is trained for travel over a vertically extending roller 18, rotatably mounted on shaft 19.

Figure 2:
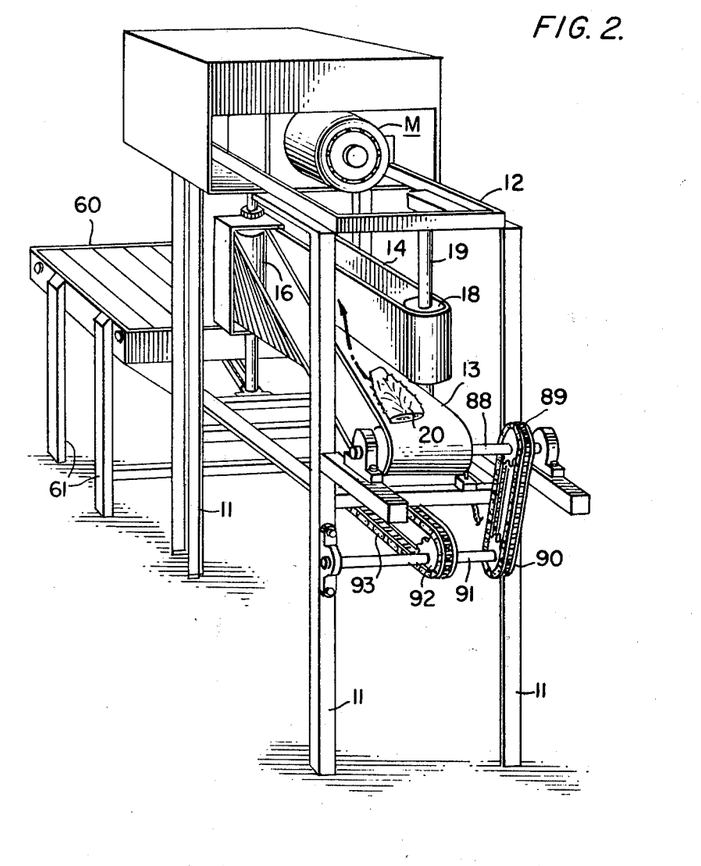
FIG. 2 is a perspective view looking at the apparatus from the front end thereof.
Figure 3:
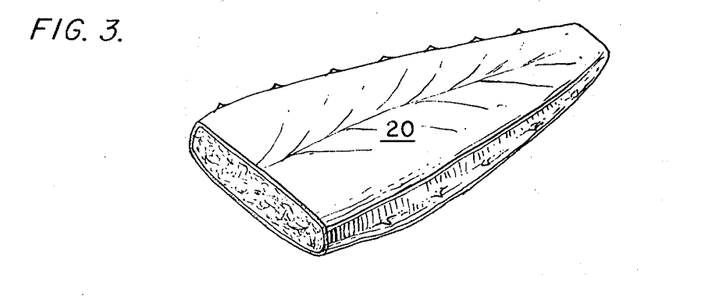
FIG. 3 is a perspective view of an aloe vera leaf with the tip and butt end of the leaf removed prior to feeding the leaf into the apparatus of the present invention.
Figure 6:
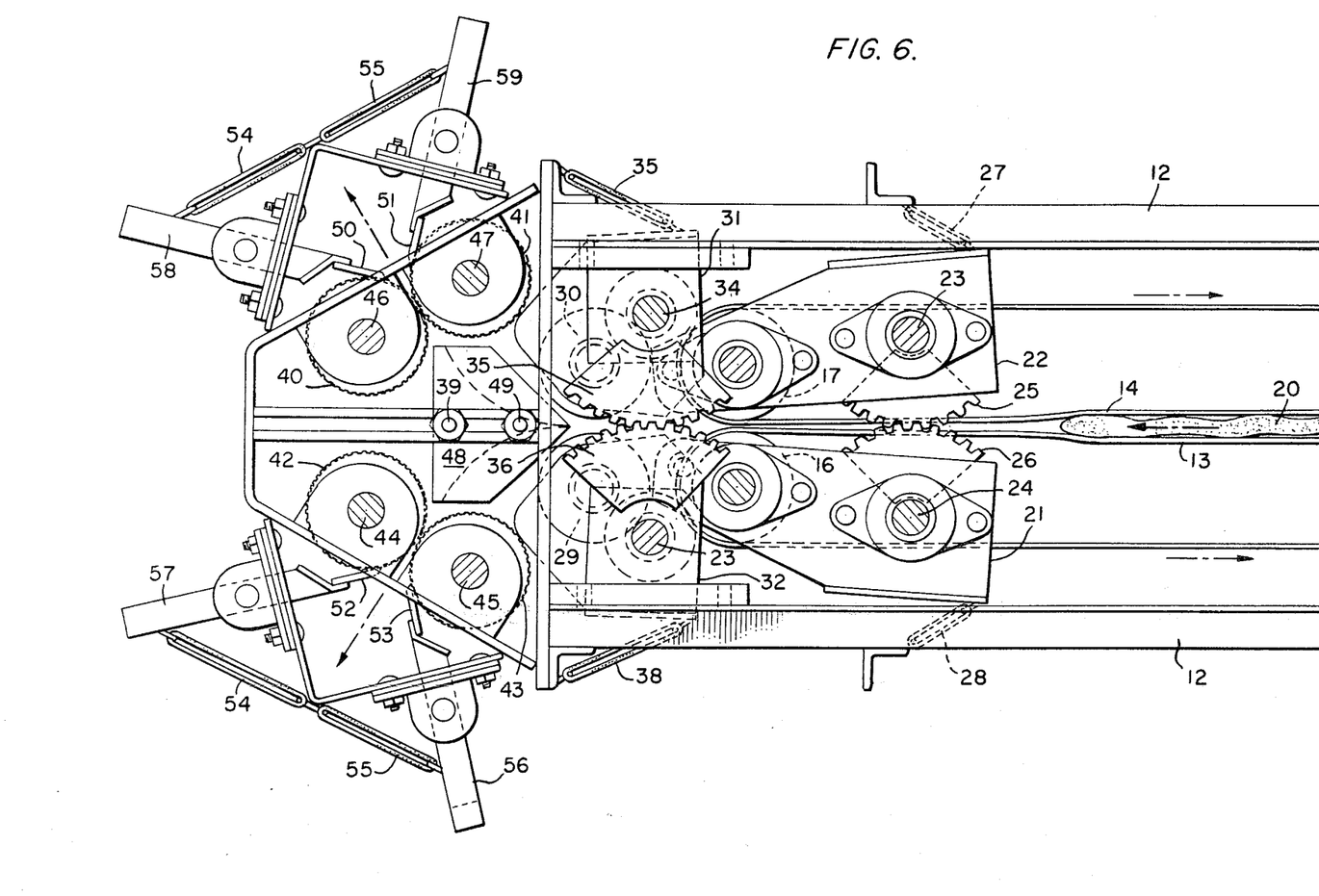
FIG. 6 is a section taken on lines 6—6 of FIG. 5, looking in the direction of the arrows.
Figures 7, 7A:
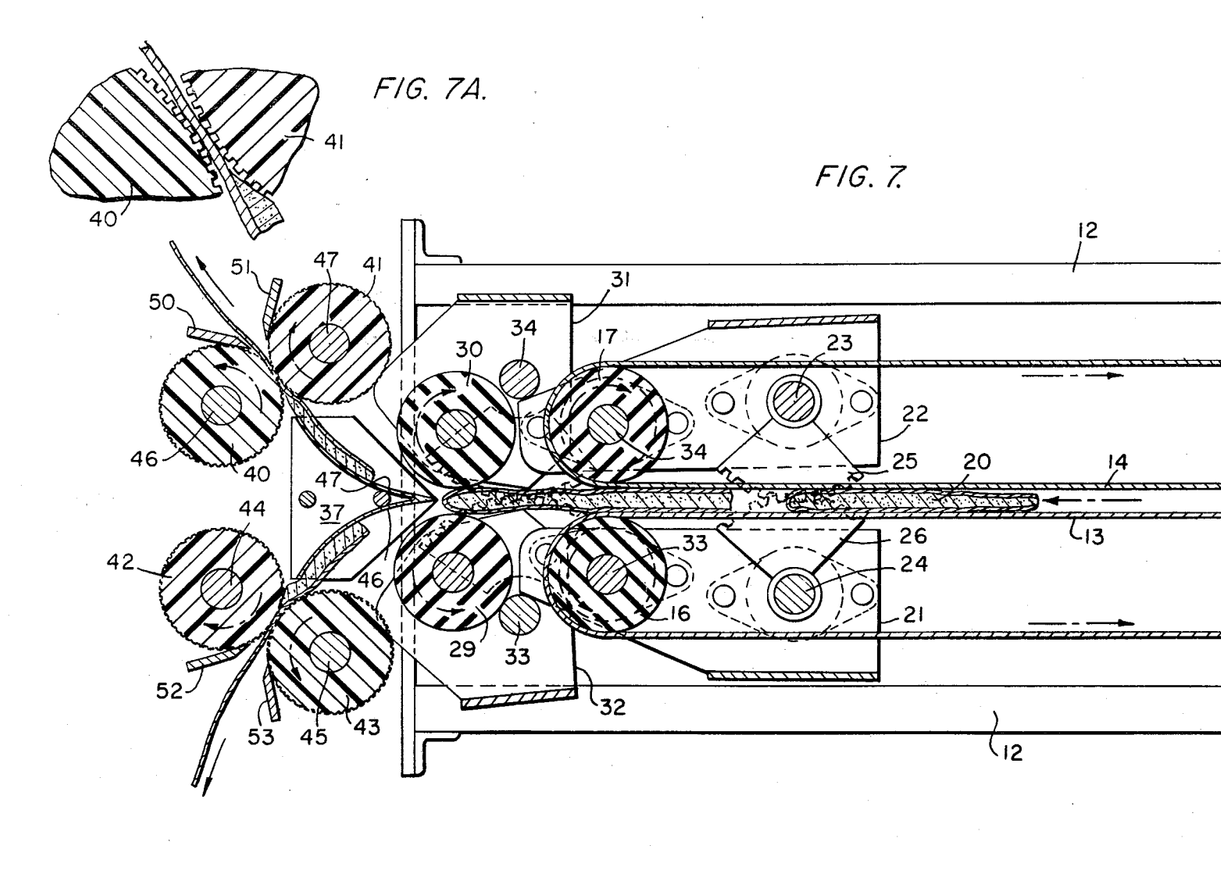
FIG. 7 is a section taken on lines 7—7 of FIG. 5, looking in the direction of the arrows.
FIG. 7A is an enlarged fragmentary view showing the squeeze rollers of the present invention.
Figure 8:
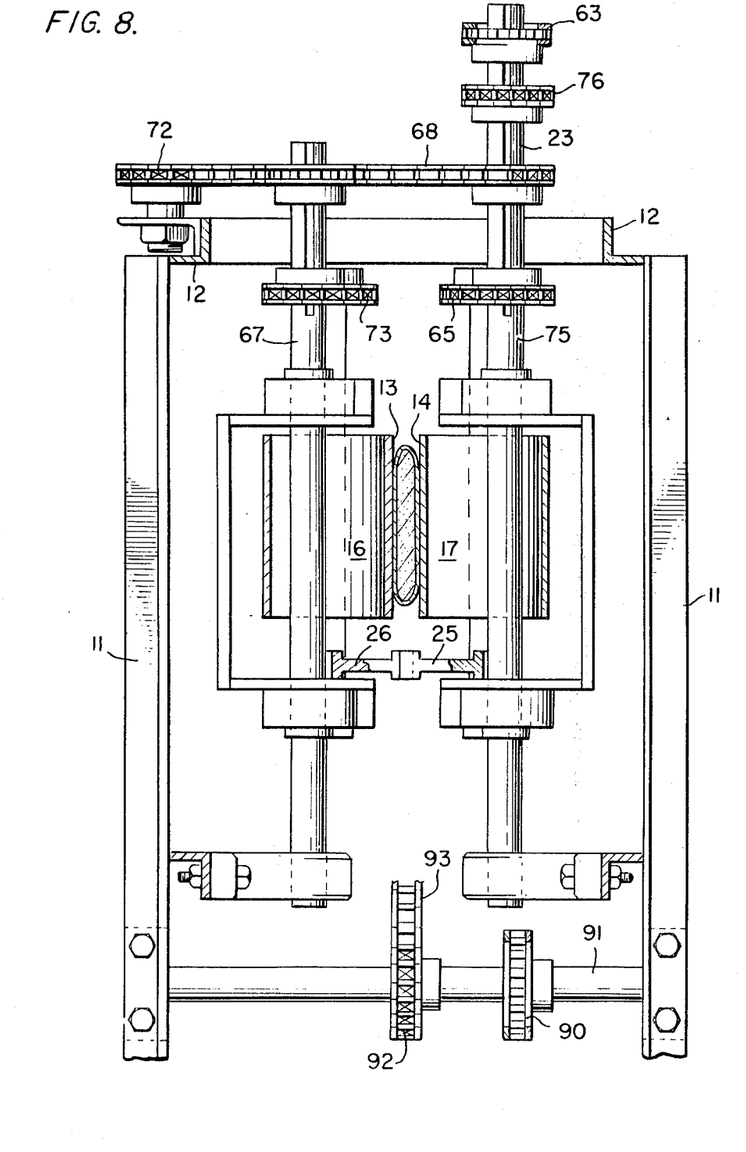
FIG. 8 is a section taken on lines 8—8 of FIG. 5, looking in the direction of the arrows.

As best seen in FIG. 2 of the drawings, endless conveyor 13, in its travel from roller 15 to roller 16, gradually twists from the horizontal to the vertical so that when an aloe vera leaf 20 is first laid flat on the surface of the belt 13, the same will, by the time the belt reaches roller 16, be turned so that it now extends vertically and when in that position it is sandwiched between belts 13 and 14 as shown more particularly in FIGS. 6, 7 and 8 of the drawings.

Rollers 16 and 17 are each mounted on pivoted frameworks 21, 22, which are journalled on shafts 23, 24 and each frameworks 21, 22, are provided with gear segments 25, 26, which are in mesh with one another as more clearly shown in FIGS. 6 and 7 of the drawings. Spring means 27, 28 extend from the frameworks and are suitably secured to the framework 12 so as to constantly urge the rollers 16 and 17 towards one another. As stated previously, the leaf of the aloe vera plant may vary in thickness and when the leaf between belts 13 and 14 reaches the rollers 16 and 17, depending on the thickness of the leaf, rollers 16 and 17 will separate to accommodate the thickness of the leaf while still retaining the leaf centrally located between the aforesaid belts. This is accomplished due to the arrangement of the gear segments mounted on the pivoted frameworks 21, 22. As can be appreciated, any movement of the pivoted frameworks due to the thickness of the leaf will translate this movement equally to each of the pivoted frameworks by reason of the segment gears. Following the travel of the leaf between the rollers, the same is immediately grasped by a pair of steel rollers 29, 30, each covered with identically grooved plastic sleeves bonded to the rollers, which are journalled for rotation on pivoted frameworks 31, 32, journalled on shafts 33, 34. As the leaf passes between rollers 29, 30, the same will be centered between these rollers by reason of a pair of meshing segment gears 35, 36, mounted on the pivoted frameworks 31, 32. Spring means 37, 38, extend between the frameworks 31, 32, and are secured in any manner to the framework of the apparatus. Spring means 37, 38, exert a tension on the pivoted frameworks 31, 32, urging the rollers 29, 30, towards one another. Thus, by reason of the segment gears mounted on the pivoted frameworks 31, 32, any separation of the rollers 29, 30, while the leaf is passing therethrough by reason of the thickness of the leaf, will be translated to the frameworks so that the leaf passing therethrough will always be centered with respect to a knife 39 positioned centrally of rollers 29, 30.

Thus, as the leaf travels through the aforesaid rollers 16, 17 and 29, 30, the same will always be centered with respect thereto by reason of the pivoted frameworks on which the rollers are mounted. As the leaf leaves the rollers 29, 30, the same will be pushed against the knife 39 to be cut midway the thickness of the leaf and the cut leaf sections are then fed between two pairs of squeeze rollers 40, 41, 42, 43, keyed for travel on shafts 44, 45, 46, 47.

The knife 39 is provided with deflector areas 48, 49 to direct the cut leaf to the aforesaid squeeze rollers. Scraper blades 50, 51, 52, 53, are provided and the blades are urged against the rollers by means of springs 54, 55, extending between pivoted arms 56, 57, 58, 59. Squeeze rollers, as shown in FIG. 7A, comprise steel rollers covered with a plastic sleeve bonded to the rollers. The plastic sleeves are of different texture with the sleeve engaging the inner or gel side of the leaf provided with a plurality of closely spaced grooves whereas the roller engaging the skin or outer side of the leaf is provided with a plurality of wider spaced apart grooves.

The gel which has been expressed from the leaf is permitted to drop into a suitable container 60 mounted on suitable vertically extending supports 61.

Figure 1:
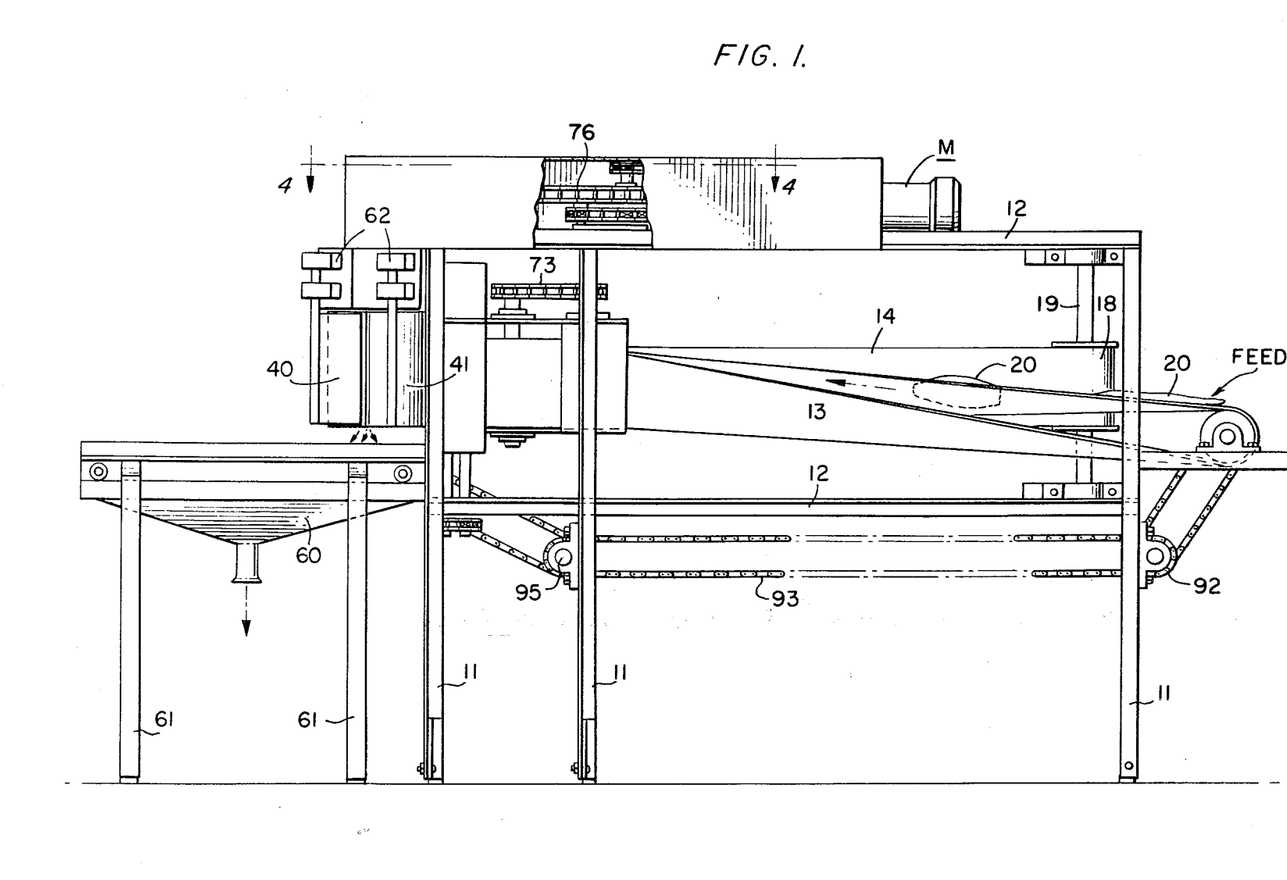
FIG. 1 is a side elevation, with parts broken away disclosing the gel separator of the present invention.

As can be seen more clearly in FIG. 1 of the drawings, the squeeze rollers are suspended from brackets 62 extending above the rollers. Suspending the rollers in this manner prevents the gel from falling on the bearings for the rollers, thus preventing corrosion of the brackets as the gel is a highly corrosive substance.

Figure 4:
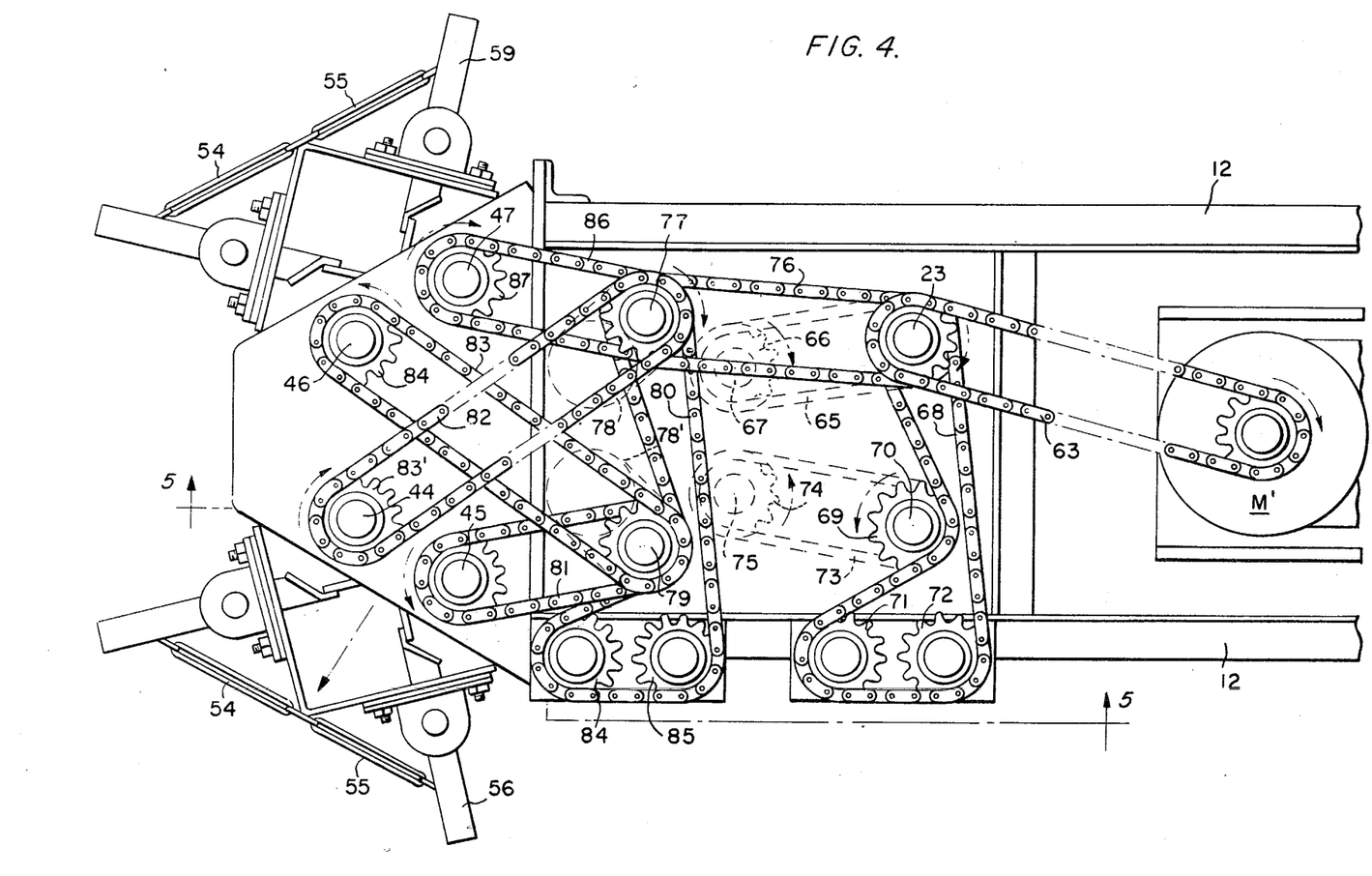
FIG. 4 is a section taken on lines 4—4 of FIG. 1, looking in the direction of the arrows.

Referring now to FIG. 4 of the drawings, there is shown the manner in which the rollers of the separator are keyed for rotation. A main drive shaft 23 derives its power from a chain drive 63 extending from motor M.

A chain drive 65 extends from shaft 23 and engages with a sprocket 66 mounted on shaft 67 to thus rotate roller 17 mounted thereon. A chain drive 68 extends from shaft 23 over a pair of idler sprockets 71, 72, then engages a sprocket 69 to drive shaft 70 and back to the drive shaft 23. A chain drive 73 extends from shaft 70 and engages a sprocket 74 keyed to shaft 75 to effect rotation of roller 16 mounted thereon. From shaft 33 a chain drive 76 extends to a sprocket mounted on shaft 77 to thus effect rotation of the shaft. A chain drive 78 extends from shaft 77 to a sprocket to effect rotation of roller 30. A like chain drive 78' extends from shaft 79 to a sprocket to effect rotation of roller 29. A chain drive 80 extends from shaft 77 over a pair of idler sprockets 84, 85, then engages sprocket 79' to drive shaft 79 and back to the drive shaft 77. Mounted on shaft 79 is a chain drive 81 which extends to shaft 45 to effect rotation of squeeze roller 43 mounted thereon. A chain drive 82 extends from shaft 77 to engage sprocket 83' to thus effect rotation of squeeze roller 42 mounted on shaft 44. A chain drive 83 extends from shaft 79 to a sprocket 84 to rotate shaft 46 and squeeze roller 40 mounted thereon. A chain drive 86 extends from the shaft 77 to engage a sprocket 87 mounted on shaft 47 to effect rotation of the squeeze roller 41 mounted thereon.

Thus, with the power being transmitted to the aforesaid shafts 23, 67, 70, 75, 77, 79, all of the rollers employed in the gel separator are driven from a single source of power derived from reducer M' secured to motor M.

As stated previously, roller 16 is driven by chain drive 73 and as the belt travels rearwardly over roller 15, shaft 88, to which the roller is keyed for rotation, will rotate a sprocket 89 and a chain drive from sprocket 89 to a sprocket 90 mounted on rotating shaft 91. A sprocket 92 mounted on shaft 91 will cause chain 93 to rotate to engage a sprocket 94 mounted on shaft 95. A chain drive 96 from shaft 95 extends to a sprocket 97 mounted on a shaft 98. A pair of endless conveyors (not shown) are driven by shaft 98 and these conveyors are positioned under the squeeze rollers to thus receive the extracted leaf and to convey the same to a suitable receiver for disposal.

This invention is not to be understood as restricted to the details set forth, since these may be modified within the scope of the appended claims without departing from the spirit and scope of the invention.

Having thus described the invention, what I claim as new and desire to secure by Letters Patent is:

1. An apparatus for feeding an aloe vera leaf to a cutting knife whereby the same will be cut into equal half sections, said apparatus comprising a pair of endless conveyor belts designed to retain the leaf therebetween and to maintain the same centrally positioned with respect to a cutter designed to cut the aforesaid leaf, said endless conveyor belts including a first pair of rollers mounted for rotation on a pair of pivoted frameworks, said frameworks permitting said first pair of rollers to move towards or away from one another depending on the thickness of the leaf passing therebetween, a second set of rollers mounted on a second pair of pivoted frameworks, said second set of rollers capable of moving towards or away from one another depending on the thickness of the leaf passing therebetween, a cutting knife blade mounted centrally of said second set of rollers to cut the leaf into two equally thick sections as said leaf is pushed against said cutting knife by said second set of rollers, and squeeze rollers for expressing the gel from within the leaf sections, said leaf sections also being fed to said squeeze rollers by said second set of rollers.

2. The structure recited in claim 1 wherein one of said pairs of endless conveyors extend from a first horizontal position and is gradually twisted in its travel over one of said pairs of rollers to thus assume a vertical position and to thereby sandwich said leaf between said one pair of endless conveyors and a second endless conveyor extending alongside said first endless conveyor traveling at the same rate of speed as said first conveyor and traveling in the same direction of travel.

3. The structure recited in claim 1 wherein said squeeze rollers are supported by brackets extending over the upper portions thereof to thereby prevent the gel extracted from the leaf to come in contact with said squeeze rollers.

4. The structure recited in claim 1 wherein said first and second pairs of rollers mounted on said pivoted frameworks are urged towards one another by spring means secured to said frameworks and to the framework of the apparatus.

5. The structure recited in claim 1 wherein said first and second set of rollers and said squeeze rollers are rotated from a single source of power actuating a main drive shaft and wherein the drive means for all of the said rollers is derived from said main drive shaft.

6. The method of separating the gel from within an aloe vera plant leaf which has been cut centrally of the thickness of the leaf comprising first feeding a leaf between a first pair of rollers of a pair of endless conveyor belts which will maintain the leaf centrally between said first pair of rollers by said first set of rollers being mounted on a pair of pivoted frameworks, directing said leaf to a second pair of rollers which are also mounted on a pair of pivoted frameworks and which will also maintain the said leaf centrally positioned between said second set of rollers, then pushing said leaf by said second set of rollers to a centrally located cutting edge whereby said leaf is cut midway of the thickness of the leaf and thereafter directing said cut leaf sections to rollers which will squeeze the gel from within the cut leaf sections.

* * * * *